(12) United States Patent
Zhang et al.

(10) Patent No.: US 12,430,805 B2
(45) Date of Patent: Sep. 30, 2025

(54) CODING OF BOUNDARY UV2XYZ INDEX FOR MESH COMPRESSION

(71) Applicant: TENCENT AMERICA LLC, Palo Alto, CA (US)

(72) Inventors: Xiang Zhang, Sunnyvale, CA (US); Xiaozhong Xu, State College, PA (US); Chao Huang, Palo Alto, CA (US); Jun Tian, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 373 days.

(21) Appl. No.: 18/191,600

(22) Filed: Mar. 28, 2023

(65) Prior Publication Data

US 2023/0334714 A1    Oct. 19, 2023

Related U.S. Application Data

(60) Provisional application No. 63/331,705, filed on Apr. 15, 2022.

(51) Int. Cl.
*G06T 9/00* (2006.01)
*H04N 19/70* (2014.01)

(52) U.S. Cl.
CPC ............. *G06T 9/001* (2013.01); *H04N 19/70* (2014.11); *G06T 9/004* (2013.01); *H04N 2201/3238* (2013.01)

(58) Field of Classification Search
None
See application file for complete search history.

(56) References Cited

U.S. PATENT DOCUMENTS

| 5,793,371 A * | 8/1998 | Deering ................. G06T 9/001 708/203 |
| 5,905,502 A | 5/1999 | Deering |
| 6,262,737 B1 * | 7/2001 | Li .......................... G06T 17/20 375/E7.092 |
| 2016/0373756 A1 | 12/2016 | Yu et al. |

(Continued)

FOREIGN PATENT DOCUMENTS

WO     2021/136878 A1    7/2021

OTHER PUBLICATIONS

International Search Report dated Jul. 25, 2023, issued in International Application No. PCT/US2023/016835.

(Continued)

*Primary Examiner* — Haris Sabah
(74) *Attorney, Agent, or Firm* — Sughrue Mion, PLLC

(57) ABSTRACT

A method performed by at least one processor in a decoder includes receiving a coded video bitstream that includes a compressed two dimensional (2D) mesh corresponding to a surface of three dimensional (3D) volumetric object. The method further includes predicting a current vertex included in the compressed 2D mesh based on an interpolation-based hierarchical prediction scheme that uses at least one sampled vertex included in the compressed 2D mesh. The method further includes deriving a prediction residual associated with the predicted current vertex. The method further includes reconstructing a boundary vertex associated with the 3D volumetric object based on the predicted current vertex and the derived prediction residual.

20 Claims, 11 Drawing Sheets

(56) References Cited

U.S. PATENT DOCUMENTS

2022/0028119 A1* 1/2022 Rhyu ............... G06T 9/001
2023/0377205 A1* 11/2023 Tian ................ G06T 9/001
2024/0397092 A1* 11/2024 Kondrad ............ H04N 19/597

OTHER PUBLICATIONS

Written Opinion dated Jul. 25, 2023, issued in International Application No. PCT/US2023/016835.
Jingliang Peng et al., "Technologies for 3D mesh compression: A survey", J. Vis. Commun. Image R., 2005, vol. 16, pp. 688-733 (46 pages).
D. Graziosi et al., "An overview of ongoing point cloud compression standardization activities: video-based (V-PCC) and geometry-based (G-PCC)", SIP, 2020, vol. 9, e13, pp. 1-17 (17 pages).
Chao Huang et al., "Boundary-Preserved Geometry Video for Dynamic Mesh Coding", IEEE, 2022, pp. 133-137 (8 pages).
Mamou Khaled et al: "Multi-Chart Geometry Video: A Compact Representation for 3D Animations", 3D Data Processing, Visualisation, and Transmission, Third International Symposium on, Jun. 14, 2006 (Jun. 14, 2006), pp. 711-718, XP093254801, Los Alamitos, Calif., USA DOI: 10.1109/3DPVT.2006.97 ISBN: 978-0-7695-2825-0.
Xiang Zhang (Tencent) et al: "[V-CG] Tencent's Dynamic Mesh Coding CfP Response", 138. MPEG Meeting; Apr. 25-29, 2022; Online; (Motion Picture Expert Group or ISO/IEC JTC1/SC29/WG11), No. m59295 Mar. 25, 2022 (Mar. 25, 2022), XP030330543.
Xiang Zhang (Tencent) et al: "[V-CG] Tencent's Dynamic Mesh Coding CfP Response", 138. MPEG Meeting; Apr. 25-29, 2022; Online; (Motion Picture Expert Group or ISO/IEC JTC1/SC29/WG11), No. m59295 Apr. 16, 2022 (Apr. 16, 2022), XP030330544.
European Search Report dated Jul. 9, 2025 in Application No. 23788750.0.

* cited by examiner

CODING OF BOUNDARY UV2XYZ INDEX FOR MESH COMPRESSION

CROSS-REFERENCE TO RELATED APPLICATION

This application claims priority from U.S. Provisional Application No. 63/331,705 filed on Apr. 15, 2022, the disclosure of which is incorporated herein by reference in its entirety.

FIELD

This disclosure is directed to a set of advanced video coding technologies. More specifically, the present disclosure is directed to video based mesh compression including methods of UV information of boundary vertices for efficient mesh compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A dynamic mesh sequence may require a large amount of data since the mesh sequence may have a significant amount of information changing over time. Therefore, efficient compression technologies are required to store and transmit such contents.

Mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

SUMMARY

According to one or more embodiments, a method performed by at least one processor in a decoder includes receiving a coded video bitstream that includes a compressed two dimensional (2D) mesh corresponding to a surface of three dimensional (3D) volumetric object. The method includes predicting a current vertex included in the compressed 2D mesh based on an interpolation-based hierarchical prediction scheme that uses at least one sampled vertex included in the compressed 2D mesh. The method includes deriving a prediction residual associated with the predicted current vertex. The method further includes reconstructing a boundary vertex associated with the 3D volumetric object based on the predicted current vertex and the derived prediction residual.

According to one or more embodiments, a decoder comprises at least one memory configured to store program code and at least one processor configured to read the program code and operate as instructed by the program code. The program code includes: receiving code configured to cause the at least one processor to receive a coded video bitstream that includes a compressed two dimensional (2D) mesh corresponding to a surface of three dimensional (3D) volumetric object. The program code includes predicting code configured to cause the at least one processor to predict a current vertex included in the compressed 2D mesh based on an interpolation-based hierarchical prediction scheme that uses at least one sampled vertex included in the compressed 2D mesh. The program code includes deriving code configured to cause the at least one processor to derive a prediction residual associated with the predicted current vertex. The program code includes reconstructing code configured to cause the at least one processor to reconstruct a boundary vertex associated with the 3D volumetric object based on the predicted current vertex and the derived prediction residual.

According to one or more embodiments, a non-transitory computer readable medium having instructions stored therein, which, when executed by at least one processor in a decoder, causes the decoder to execute receiving a coded video bitstream that includes a compressed two dimensional (2D) mesh corresponding to a surface of three dimensional (3D) volumetric object. The instructions further cause the at least one processor to execute predicting a current vertex included in the compressed 2D mesh based on an interpolation-based hierarchical prediction scheme that uses at least one sampled vertex included in the compressed 2D mesh. The instructions further cause the at least one processor to execute deriving a prediction residual associated with the predicted current vertex. The instructions further cause the at least one processor to execute reconstructing a boundary vertex associated with the 3D volumetric object based on the predicted current vertex and the derived prediction residual.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
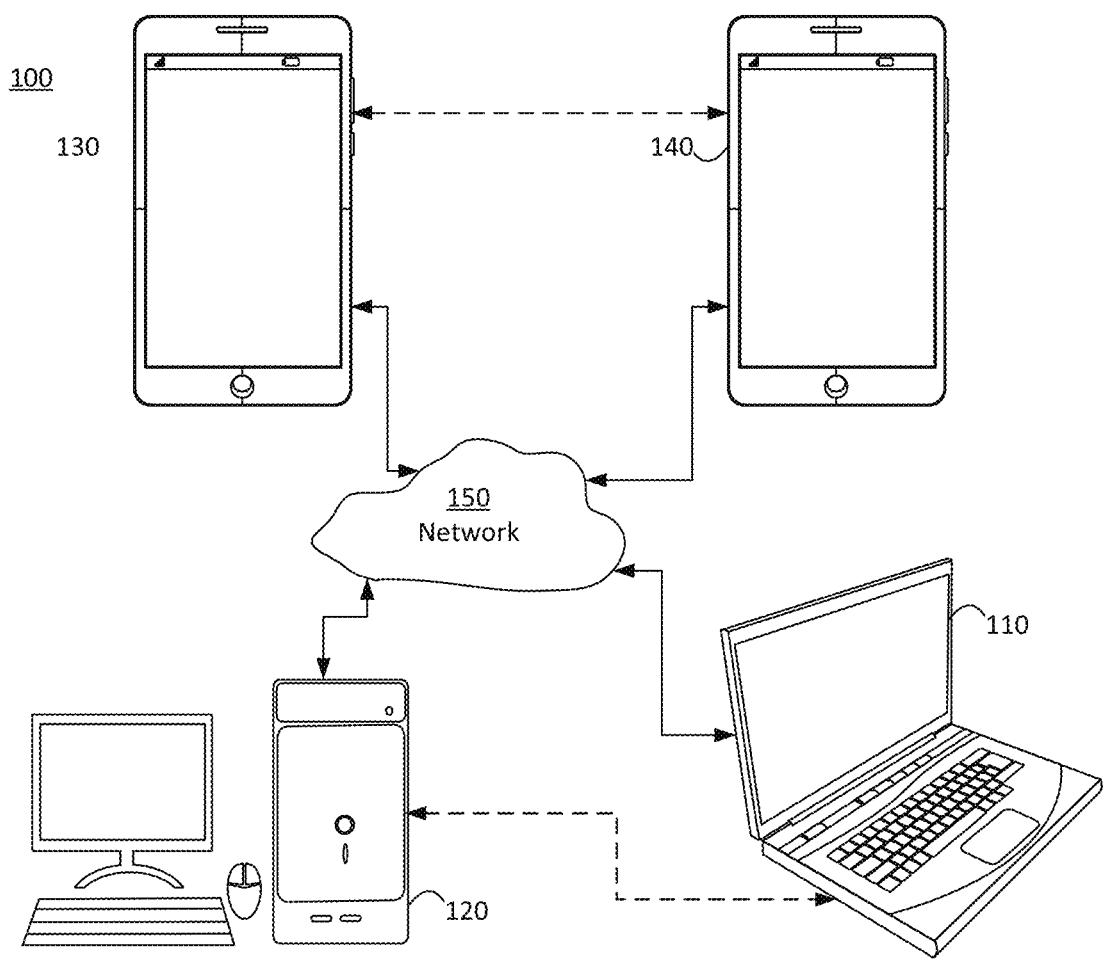
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure are directed to compressing a mesh. A mesh may be composed of several polygons that describe the surface of a volumetric object. Its vertices in 3D space and the information of how the vertices are connected may define each polygon, referred to as connectivity information. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

As stated above, a 3D mesh or dynamic meshes may require a large amount of data since it may consist of a significant amount of information changing over time. Existing standards do not take into account time varying attribute maps and connectivity information. Existing standards also do not support volumetric acquisition techniques that generate a constant connectivity dynamic mesh, especially under real-time conditions.

Therefore, a new mesh compression standard to directly handle dynamic meshes with time varying connectivity information and optionally time varying attribute maps is needed. Embodiments of the present disclosure enable efficient compression technologies to store and transmit such dynamic meshes. Embodiments of the present disclosure enable lossy and/or lossless compression for various applications, such as real-time communications, storage, free viewpoint video, AR and VR.

According to one or more embodiments of the present disclosure, methods, systems, and non-transitory storage mediums for dynamic mesh compression are provided. Embodiments of the present disclosure may also be applied to static meshes, where only one frame of the mesh or the mesh content does not change over time.

Figure 2:
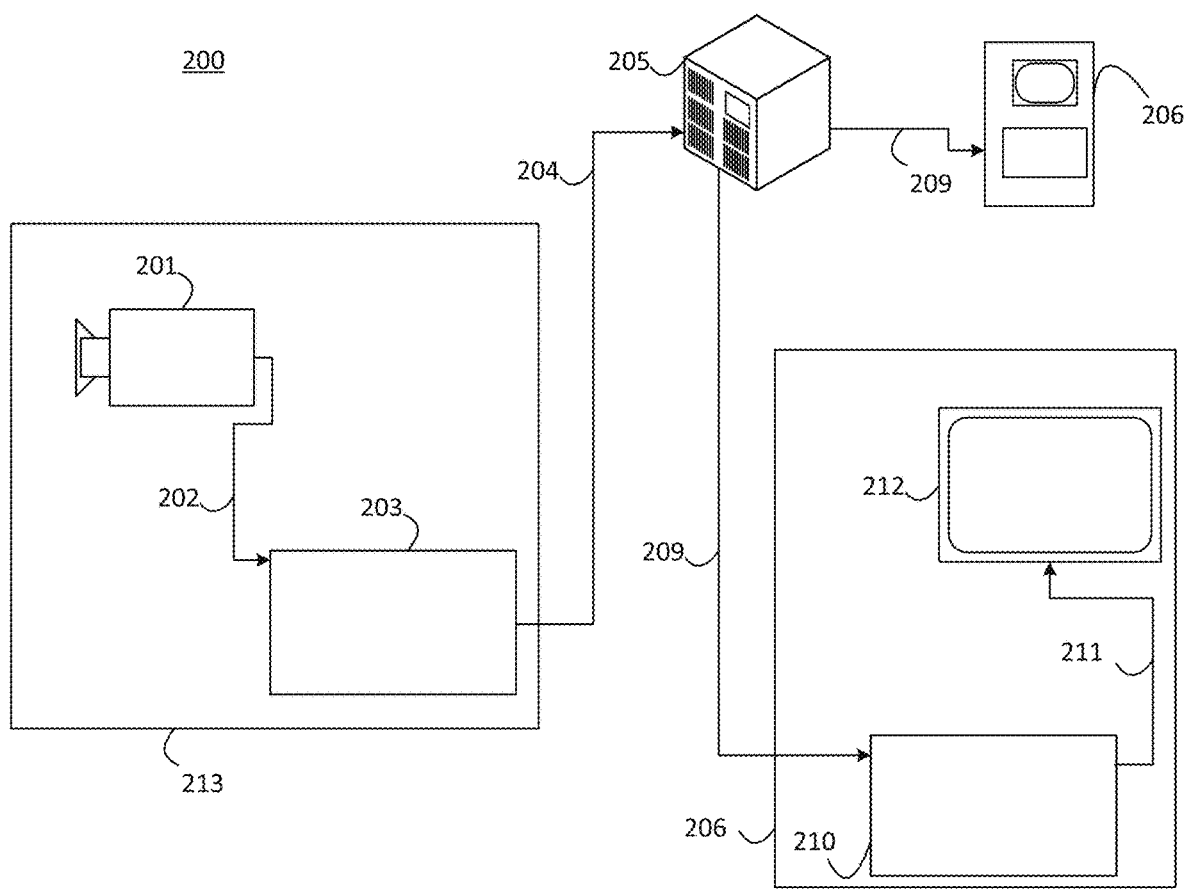
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. A 3D mesh may be composed of several polygons that describe the surface of a volumetric object. For example, the 3D mesh may contain a plurality of vertices in a 3D space where each vertex is associated with a 3D coordinate (e.g., x, y, z). The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted).

In some streaming systems, the video bitstreams 204, 209 may be encoded according to certain video coding/compression standards.

Figure 3:
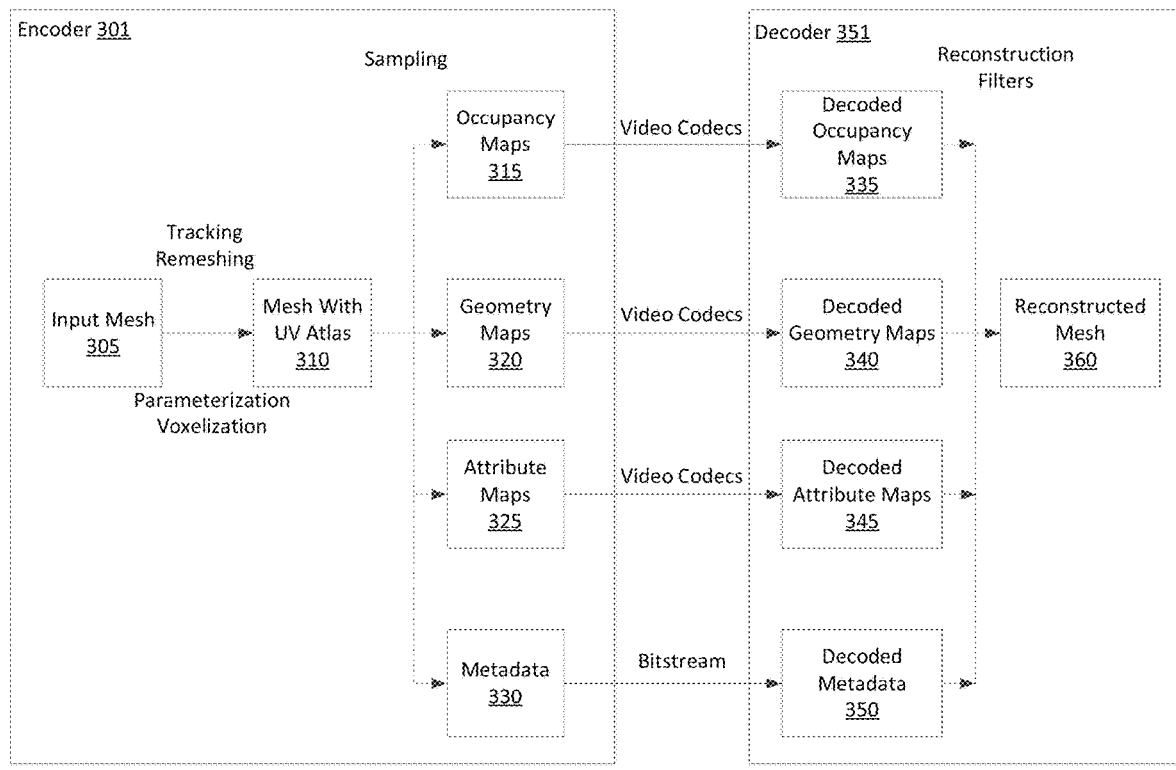
FIG. 3 is a schematic illustration of a block diagram of a video encoder and decoder, in accordance with embodiments of the present disclosure.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to one or more embodiments of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh may be a chart of vertices each associated with a coordinate in a 2D space (e.g., 2D coordinate). Each vertex in the 2D mesh may be associated with a corresponding vertex in a 3D mesh where the vertex in the 3D mesh is associated with a coordinate in a 3D space. A compressed 2D mesh may be a version of the 2D mesh with a reduction in information compared to the uncompressed 2D mesh. For example, the 2D meshed may be sampled at a sampling rate where the compressed 2D mesh includes the sampled points. The 2D mesh with UV atlas may be a mesh in which each vertex of the mesh may be associated with UV coordinates on a 2D atlas. For example, the 2D atlas may be a two dimensional plane where each 3D coordinate in a 3D space may be assigned to a 2D coordinate in the 2D plane. The connected 2D coordinates may be referred to as a 2D chart or patch. The mesh with the UV atlas 310 may be processed and converted into a plurality of maps based on sampling. As an example, the UV atlas 310 may be processed and converted into occupancy maps, geometry maps, and attribute maps based on sampling the 2D mesh with the UV atlas. The generated occupancy maps 335, geometry maps 340, and attribute maps 345 may be encoded using appropriate codecs (e.g., HVEC, VVC, AV1, AVS3 etc.) and transmitted to a decoder. In some embodiments, metadata (e.g., connectivity information etc.) may also be transmitted to the decoder.

In some embodiments, on the decoder side, the meshes may be reconstructed from the decoded 2D maps. Post-processing and filtering may also be applied on the reconstructed meshes. In some examples, metadata might be signaled to the decoder side for the purpose of 3D mesh reconstruction. The occupancy map may be inferred from the decoder side if the boundary vertices of each patch are signaled.

According to an aspect, the decoder 351 may receive the encoded occupancy maps, geometry maps, and attribute maps from an encoder. The decoder 315 may use appropriate techniques and methods, in addition to embodiments described herein, to decode the occupancy maps, geometry maps, and attribute maps. In some embodiments, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

Figure 4:
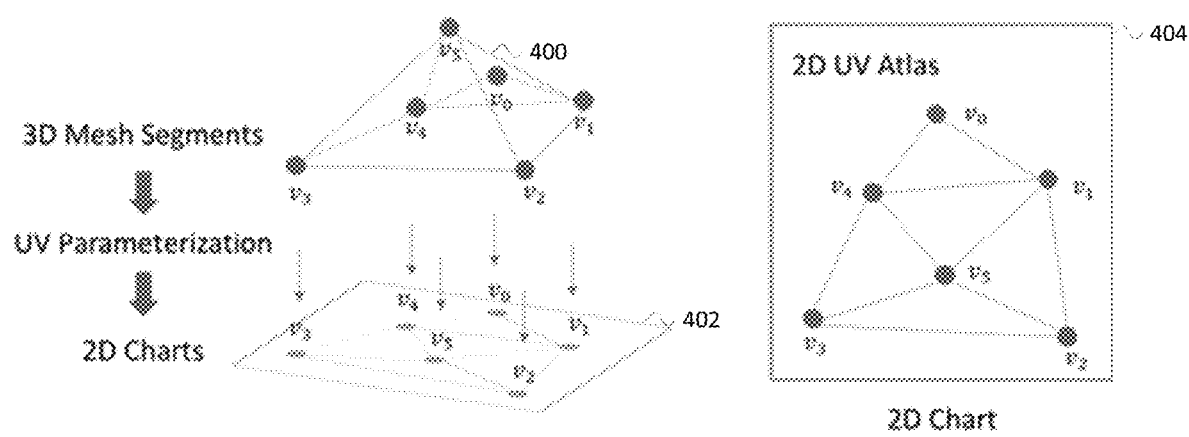
FIG. 4 illustrates an example of UV parameterization mapping from 3D mesh segments onto 2D charts, in accordance with embodiments of the present disclosure.

According to some embodiments, a 3D mesh may be partitioned into several segments (or patches/charts). Each segment may be composed of a set of connected vertices associated with their geometry, attribute, and connectivity information. As illustrated in FIG. 4, a UV parameterization process maps a mesh segment 400 onto a 2D chart in the 2D UV atlas (402, 404). Each vertex in the mesh segment may be assigned with a 2D UV coordinates in the 2D UV atlas. The vertices in a 2D chart may form a connected component as their 3D counterpart. The geometry, attribute, and connectivity information of each vertex may be inherited from their 3D counterpart as well.

Figure 5:
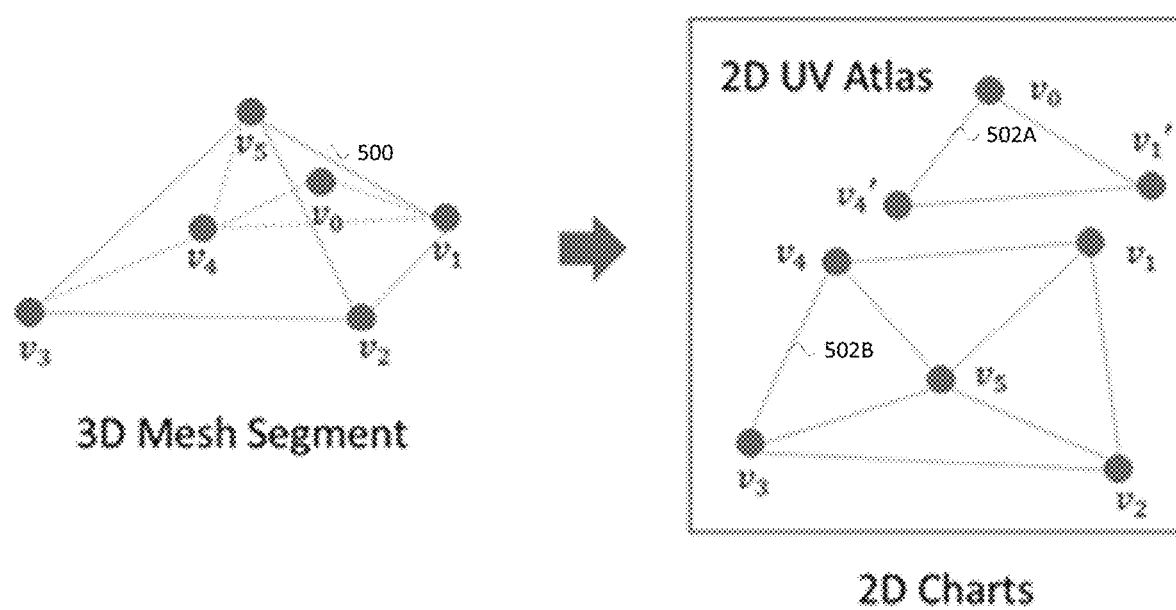
FIG. 5 illustrates an example of different UV parameterization where a 3D mesh segment is mapped to multiple separate charts

According to some embodiments, a 3D mesh segment may also be mapped to multiple separate 2D charts. When the 3D mesh segment is mapped to separate 2D charts, a vertex in the 3D mesh segment may correspond to multiple vertices in 2D UV atlas. As illustrated in FIG. 5, a 3D mesh segment 500, which may correspond to the 3D mesh segment 400, may be mapped to two 2D charts (502A, 502B), instead of a single chart, in the 2D UV atlas. As illustrated in FIG. 5, 3D vertices $v_1$ and $v_4$ have two 2D correspondences vertices $v_1'$ and $v_4'$ respectively.

Figure 6:
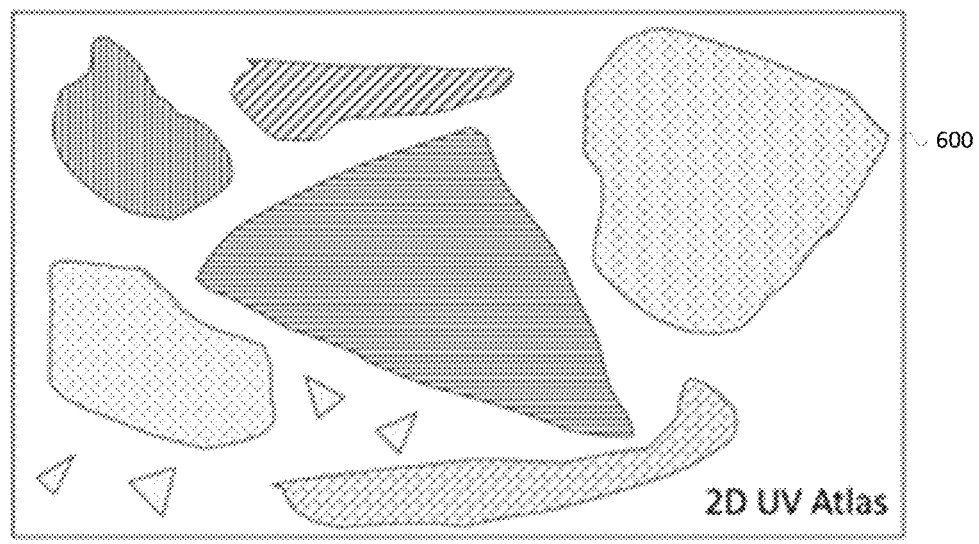
FIG. 6 illustrates an example 2D UV atlas with multiple charts, in accordance with embodiments of the present disclosure.

FIG. 6 illustrates an example of a general 2D UV atlas 600 of a 3D mesh that includes multiple charts, where each chart may contain multiple (e.g., more than or equal to 3) vertices associated with their 3D geometry, attribute, and connectivity information.

Figure 7:
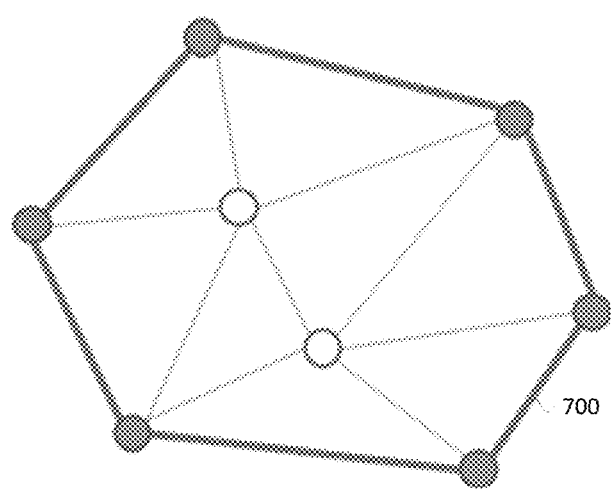
FIG. 7 illustrates an example of boundary vertices in a 2D patch, in accordance with embodiments of the present disclosure.

Boundary vertices may be defined in the 2D UV space. As shown in FIG. 7, the filled vertices are boundary vertices since they are on the boundary edges of a connected component (a patch/chart). A boundary edge may be determined by checking if the edge only appears in one triangle. The geometry information (e.g., 3D xyz coordinates) and 2D UV coordinates may be signaled in a bitstream.

A dynamic mesh sequence may require a large amount of data since the mesh sequence may consist of a significant amount of information changing over time. In particular, the boundary information represents a significant part of the entire mesh. Therefore, efficient compression technologies are needed to efficiently compress the boundary information.

The embodiments of the present disclosure may be used separately or combined in any order. Furthermore, each of the methods (or embodiments), encoder, and decoder may be implemented by processing circuitry (e.g., one or more processors or one or more integrated circuits). In one example, the one or more processors execute a program that is stored in a non-transitory computer-readable medium.

According to the embodiments of the present disclosure, a number of methods are proposed for coding of patch boundary's UV coordinates in mesh compression. Note that they may be applied individually or by any form of combinations. It should be also noted that the methods may be applied to static meshes, where there is only one frame of the mesh, or the mesh content does not change over time. Furthermore, similar methods may also be extended to coding of depth images/attribute images/texture images/etc.

According to some embodiments, input meshes with 2D UV atlases may have vertices, where each vertex of the mesh may have associated UV coordinates on the 2D atlas. The occupancy, geometry, and attribute maps may be generated by sampling one or more points/positions on the UV atlas. Each sample position, if it is inside a polygon defined by the mesh vertices, may be occupied or unoccupied. For each occupied sample, one may calculate its corresponding 3D geometry coordinates and attributes by interpolating from the associated polygon vertices.

According to an aspect of the present disclosure, the sampling rate may be consistent over the whole 2D atlas. In some embodiments, the sampling rate for u and v axes may be different, making anisotropic remeshing possible. In some embodiments, the whole 2D atlas may be divided into multiple regions, such as slices or tiles, and each such region may have a different sampling rate.

According to one or more embodiments of the present disclosure, the sampling rate for each region (or the entire 2D atlas) may be signaled in a high-level syntax, including but not limited to sequence header, frame header, slice header, etc. In some embodiments, a sampling rate for each region (or the entire 2D atlas) may be chosen from a pre-established set of rates that have been assumed by both the encoder and decoder. Since the pre-established set of rates may be known by both the encoder and decoder, signaling of one particular sampling rate may require only signaling the index in the pre-established rate set. An example of such a pre-established set may be every 2 pixels, every 4 pixels, every 8 pixels, etc. In some embodiments, the sampling rate for each region (or the entire 2D atlas) of a mesh frame may be predicted from a pre-established rate set, from a previously used sampling rate in other already coded regions of the same frame, or from a previously used sampling rate in other already coded mesh frames.

In some embodiments, the sampling rate for each region (or the entire 2D atlas) may be based on some characteristic of each region (or the entire 2D atlas). As an example, the sample rate may be based on activity—for a rich-textured region (or the entire 2D atlas), or a region (or the entire 2D atlas) with high activity, the sample rate may be set higher. As another example, for a smooth region (or the entire 2D atlas), or a region (or the entire 2D atlas with low activity, the sample rate may be set lower.

In some embodiments, the sampling rate for each region (or the entire 2D atlas) of a mesh frame may be signaled in a way that combination of prediction and direct signaling may be allowed. The syntax may be structured to indicate if a sampling rate will be predicted or directly signaled. When predicted, which of the predictor-sampling rate to be used may be further signaled. When directly signaled, the syntax to represent the value of the rate may be signaled.

Figure 8:
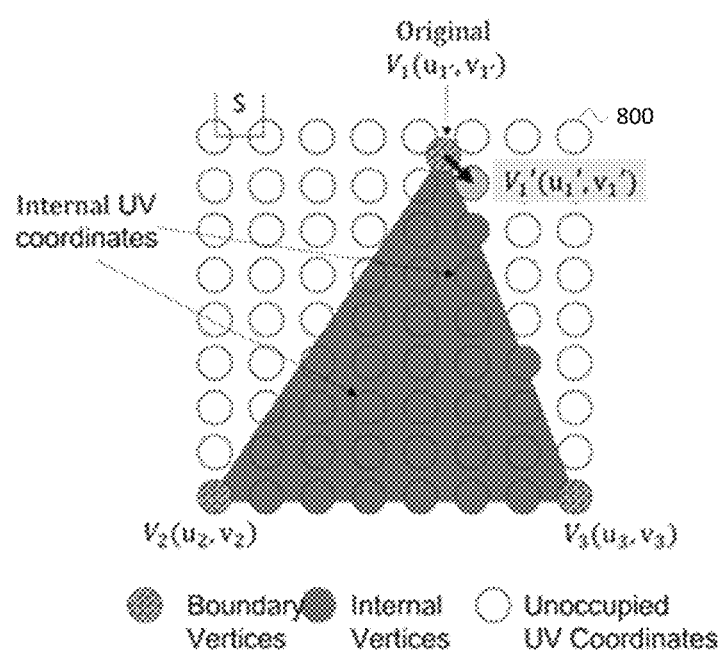
FIG. 8 illustrates an example of sampled coordinates on a UV plane, in accordance with embodiments of the present disclosure.

FIG. 8 illustrates an example of sampled coordinates on a UV plane 800, where the textured points V1, V2 and V3 are the boundary vertices' UV coordinates. The entire UV plane may be sampled at a fixed interval of samples. The distance (e.g., in terms of number of original samples) between two adjacent samples in FIG. 8 may be referred to the sampling step (or sampling rate). The original UV coordinates of these vertices may not fall exactly at the sampled locations on the UV plane, such as the original location of V1. The nearest sampled coordinate V1' may be used as a predictor in compression.

The UV coordinates of boundary vertices may be coded in two parts including, for example, the sampled coordinates and the offsets. In FIG. 8, the coordinates $(u_i, v_i)$ may be the original UV coordinates of a boundary vertex of a patch, where $i=0, 1, \ldots, N-1$, N is the number of boundary vertices in the chart. The sampling rate of the charts may be denoted as S. After sampling the UV plane 800, the sampled coordinates $(\bar{u}_i, \bar{v}_i)$ of the boundary vertices may be calculated by dividing $(u_i, v_i)$ with the sampling rate followed with rounding. For example the rounding may be performed as:

$$\bar{u}_i = \text{round}\left(\frac{u_i}{S}\right), \quad \text{Eq. 1}$$

$$\bar{v}_i = \text{round}\left(\frac{v_i}{S}\right). \quad \text{Eq. 2}$$

In one or more examples, various rounding operations, such as the flooring or ceiling operation, may also be applied after dividing when calculating the sampled coordinates. The offsets of UV coordinates $(\bar{u}_i, \bar{v}_i)$ of the boundary vertices may be calculated as follows:

$$\tilde{u}_i = u_i - \bar{u}_i \cdot S, \quad \text{Eq. 3}$$

$$\tilde{v}_i = v_i - \bar{v}_i \cdot S. \quad \text{Eq. 4}$$

Accordingly, the offset for the boundary vertex V1 in FIG. 8 may be calculated as follows:

$$\tilde{u}_1 = u_1 - u_1' \cdot S, \quad \text{Eq. 5}$$

$$\tilde{v}_1 = v_1 - v_1' \cdot S. \quad \text{Eq. 6}$$

In one or more examples, both the sampled coordinates and offsets may be coded by lossless or lossy coding. The reconstructed sampled coordinates and offsets may be denoted as $(\hat{u}_i, \hat{v}_i)$ and $(\ddot{u}_i, \ddot{v}_i)$, respectively. On the decoder side, the reconstructed UV coordinates of boundary vertices (e.g., $(\hat{u}_i, \hat{v}_i)$), may be derived as follows:

$$\hat{u}_i = \hat{u}_i \cdot S + \ddot{u}_i, \quad \text{Eq. 87}$$

$$\hat{v}_i = \hat{v}_i \cdot S + \ddot{v}_i. \quad \text{Eq. 8}$$

According to some embodiments, previous coded sampled coordinates may be used to predict the current sampled coordinates. In one or more embodiments, the UV coordinates of vertices on the same boundary loop may be coded together in order. The UV coordinates of the one vertex that is prior to the current vertex in decoding order may be used as a predictor for the current UV coordinates. The predicted sampled coordinates of current boundary vertex may be denoted as $(\bar{u}_{p_i}, \bar{v}_{p_i})$. Different prediction techniques may be applied for this purpose.

In one or more embodiments, a previously coded sampled coordinate may be used for prediction of a current coordinate as follows:

$$\bar{u}_{p_i} = \bar{u}_{i-1}, \quad \text{Eq. 9}$$

$$\bar{v}_{p_i} = \bar{v}_{i-1}. \quad \text{Eq. 10}$$

In one or more embodiments, two previously coded sampled coordinates may be used to predict a current coordinate. For example, the current coordinate may be predicted using two previously coded sampled coordinates with linear prediction as follows:

$$\bar{u}_{p_i} = 2 \cdot \bar{u}_{i-1} - \bar{u}_{i-2}, \quad \text{Eq. 11}$$

$$\bar{v}_{p_i} = 2 \cdot \bar{v}_{i-1} - \bar{v}_{i-2}. \quad \text{Eq. 12}$$

In one or more examples, prediction with higher order polynomials may also be employed.

Figure 9:
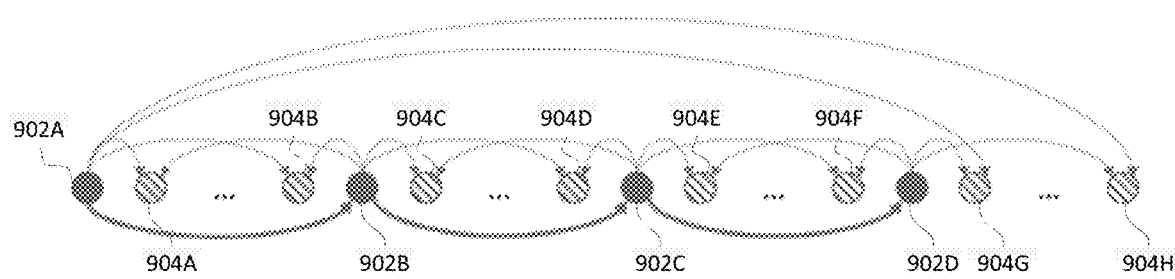
FIG. 9 illustrates an example of an interpolation-based hierarchical prediction scheme, in accordance with embodiments of the present disclosure.

According to one or more embodiments, an interpolation-based hierarchical prediction scheme may be used for the sampled UV coordinates. FIG. 9 illustrates a set of sampled vertices 900. In one or more examples, a first prediction type includes coding vertices (e.g., vertices with solid filling) by uni-directional prediction (e.g., thick arrows). For example, as illustrated in FIG. 9, vertices 902A-902D are coded in accordance with the first prediction type. In one or more examples, any combination (e.g., weighted summation) of previous coded solid vertices may be used for prediction of the current solid vertex. For example, as illustrated in FIG. 9, vertex 902A is used to predict vertex 902B. In one or more examples, an interval between solid vertices may be fixed for both the encoder and the decoder, or signaled in the bitstream at different levels. For example, different intervals may be used for different frames, or for different charts.

According to some embodiments, a second prediction scheme includes applying a bi-directional prediction, where the prediction may be derived from two coded vertices. For example, the vertices 904A-904H (e.g., dashed vertices) are predicted based on the second prediction scheme, as illustrated in FIG. 9. The prediction of a dashed vertex may be based on solid vertices and/or dashed vertices. In one or more examples, any combination (e.g., weighted summation) of previous coded vertices may be used for prediction of a current dashed vertex. In one or more example, the last group of dashed vertices (e.g., 904G and 904H) may be predicted from the first solid vertex (e.g., 902A). As illustrated in FIG. 9, the dashed vertices may be predicted from the linear interpolation of two neighboring solid vertices in opposite directions. In one or more example, any interpolation method may be used to derive the prediction, where the distance of two vertices may be defined by the number of vertices in between them.

According to one or more embodiments, after the current coordinate (e.g., current vertex) is predicted, the prediction residual of the sampled coordinates may be derived as follows:

$$\bar{u}_{r_i} = \bar{u}_i - \bar{u}_{p_i}, \quad \text{Eq. 13}$$

$$\bar{v}_{r_i} = \bar{v}_i - \bar{v}_{p_i}. \quad \text{Eq. 14}$$

The prediction residual may be coded by one or more different methods. In one or more embodiments, the prediction residual may be coded by fixed length coding. The bit length may either be coded in high-level syntax table for all patches, or be coded differently for each patch. In one or more embodiments, the prediction residual may be coded by Exponential-Golomb coding.

In one or more embodiments, the prediction residual may be coded by unary coding. In one or more embodiments, the prediction residual may be coded by the syntax elements as shown in Table 1.

TABLE 1

|  | Descriptor |
|---|---|
| sampled_uv_prediction_residual ( ) { | |
|   prediction_residual_eq0 | ae(v) |
|   if ( !prediction_residual_eq0 ) { | |
|     prediction_residual_sign | u(1) |
|     prediction_residual_abs_eq1 | ae(v) |
|     if ( !prediction_residual_eq1 ) { | |
|       prediction_residual_abs_eq2 | ae(v) |
|       if ( !prediction_residual_eq1 ) { | |
|         prediction_residual_abs_minus3 | ue(v) |
|       } | |
|     } | |
|   } | |
| } | |

In one or more examples, the variable prediction_residual_sign may be coded by bypass coding. In one or more examples, the variable prediction_residual_eq0 may specify whether the prediction residual equals to 0 or not. In one or more examples, the variable prediction_residual_sign may specify the sign bit of the prediction residual. In one or more examples, the variable prediction_residual_abs_eq1 may specify whether the absolute value of the prediction residual equals to 1 or not. In one or more examples, the variable prediction_residual_abs_eq2 may specify whether the absolute value of the prediction residual equals to 2 or not. In one or more examples, the variable prediction_residual_abs_minus3 may specify the absolute value of the prediction residual minus 3.

According to one or more embodiments, the prediction residual may be coded by the syntax elements as shown in Table 2.

|  | Descriptor |
|---|---|
| sampled_uv_prediction_residual ( ) { |  |
|   prediction_residual_eq0 | ae(v) |
|   if ( !prediction_residual_eq0 ) { |  |
|     prediction_residual_sign | ae(v) |
|     prediction_residual_abs_eq1 | ae(v) |
|     if ( !prediction_residual_eq1 ) { |  |
|       prediction_residual_abs_eq2 | ae(v) |
|       if ( !prediction_residual_eq1 ) { |  |
|         prediction_residual_abs_minus3 | ue(v) |
|       } |  |
|     } |  |
|   } |  |
| } |  |

In one or more examples, the variable prediction_residual_sign may be coded by arithmetic coding, where different contexts may be used. For example, the sign of the prediction residual of the previous coded boundary vertex may be used as the context. In one or more examples, the variable prediction_residual_eq0 may specify whether the prediction residual equals to 0 or not. In one or more examples, the variable prediction_residual_sign may specify the sign bit of the prediction residual. In one or more examples, the variable prediction_residual_abs_eq1 may specify if the absolute value of the prediction residual equals to 1 or not. In one or more examples, the variable prediction_residual_abs_eq2 may specify if the absolute value of the prediction residual equals to 2 or not. In one or more examples, prediction_residual_abs_minus3 may specify the absolute value of the prediction residual minus 3.

According to one or more embodiments, on the decoder side, the prediction residual of the sampled UV coordinates may be derived from the above-described syntax elements. For example, the U coordinate may be recovered by the following steps:

```
if ( prediction_residual_eq0 ) {
  ū_rj = 0;
} else {
  if ( prediction_residual_abs_eq1 ) {
    ū_rj = prediction_residual_sign ? 1 : −1;
  } else if ( prediction_residual_abs_eq2 ) {
    ū_rj = prediction_residual_sign ? 2 : −2;
  } else {
    ū_rj = prediction_residual_sign ? prediction_residual_abs_minus3 +
3 : − prediction_residual_abs_minus3 − 3;
  }
}
```

As understood by one of ordinary skill in the art, the V coordinate may be recovered using the same or similar steps described above to recover the U coordinate.

According to one or more embodiments, the prediction of UV boundary coordinates may also come from a previous coded mesh frame. In case of different sampling rates between the ones applied to the current mesh frame and the ones in a previous mesh frame, the predictor may be dequantized to its original value and then quantized according to the current sampling rate.

According to one or more embodiments, when the interpolation-based hierarchical prediction scheme is applied as shown in FIG. 9, different residual coding schemes for vertices in different layers may be applied, where any combination of the aforementioned residual coding methods may be used.

In one or more examples, the prediction residual of the UV boundary coordinates may also transformed before entropy coded. Different transform functions may be employed, for example, discrete cosine/sine transform, wavelet transform, (fast) Fourier transform, spline transform, etc.

According to one or more embodiments, a transform may be applied to partial prediction residuals based on different prediction schemes that are used. For example, when the interpolation-based hierarchical prediction scheme is applied as illustrated in FIG. 9, a transform may be applied to the prediction residuals of the dashed vertices in higher prediction layers with bi-directional prediction.

According to one or more embodiments, a fixed point 1-D transform may be applied to the prediction residuals. For example, a 16-point 1-D transform may be applied to the prediction residuals. In this case, the residuals may be grouped into 16 samples so that each group may use a transform.

According to one or more embodiments, a fixed point 2-D transform may be applied to the prediction residuals. For example, a 4×4 2-D transform may be applied to the prediction residuals. In this case, the residuals may be grouped into 16 samples (e.g., in the form of a 8×8 residue block) so that each group may use a transform.

According to one or more embodiments, transforms with multiple kernels may be applied to the prediction residuals. For example, a 4×4 2-D transform wither either DCT or DST may be applied to the prediction residuals. In this case, the residuals may be grouped into 16 samples (in the form of 8×8 residue block) so that each group may use a transform. Furthermore, the encoder may send the transform type index selected for each group so that the decoder is able to decode the correct transform coefficients associated with the transform type.

According to one or more embodiments, combinations of the fixed point 1-D or 2-D transforms may be applied to the prediction residuals. For example, a 4×4, 8×4, and 4×8 2-D transform may be applied to the prediction residuals. In this case, the residuals may be grouped into either 16 or 32 samples (e.g., in the form of 2-D residue blocks) so that each group may use a transform. The encoder may send the transform size index selected for each group so that the decoder is able to decode the correct number of transform coefficients associated with the transform.

Figure 10:
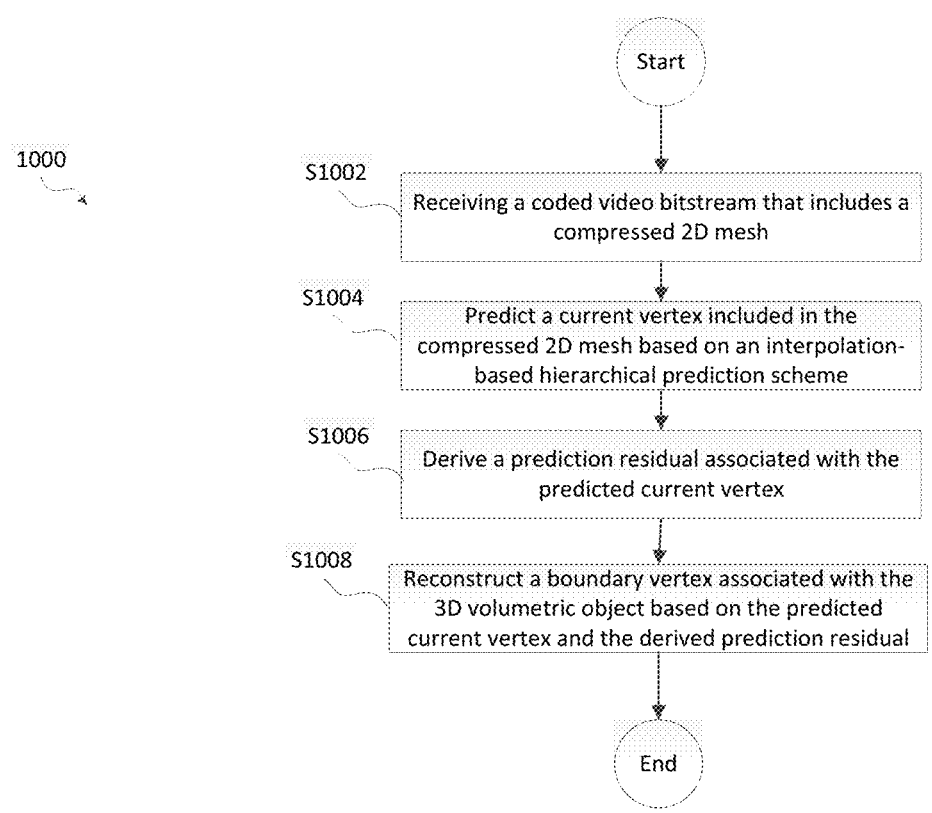
FIG. 10 illustrates an example process for reconstructing a boundary vertex, in accordance with embodiments of the present disclosure.

FIG. 10 illustrates a process 1000 for reconstructing a boundary vertex based on a compressed 2D mesh, according to one or more embodiments. The process may start at operation S1002 where a coded video bitstream that includes a compressed 2D mesh is received. The compressed 2D mesh may correspond to a compression of the sampled UV plane 800 (FIG. 8). The process proceeds to operation S1004 where a current vertex included in the compressed 2D mesh is predicted based on an interpolation-based hierarchical prediction scheme. For example, the interpolation-based hierarchical prediction scheme may predict the current vertex based on the first prediction type or the second prediction type discussed above.

The process proceeds to operation S1006 where a prediction residual associated with the predicted current vertex is derived. For example, the prediction residual may be derived in accordance with any one of Eqs. (3)-(6) or in accordance with the syntax elements specified in any one of Tables 1 or 2. Furthermore, the prediction residual may be derived based on an N-point 1-D transform or an N×N 2-D transform. The process proceeds to operation S1008 where a boundary vertex associated with the 3D volumetric object is reconstructed based on the predicted current vertex and the derived prediction residual. For example, referring to FIG. 8, the process of FIG. 10 may predict the sampled 2D coordinate (e.g., current vertex) $V_1'$ ($u_1'$, $v_1'$) and derive a corresponding offset to reconstruct the original 2D coordinate (e.g., boundary vertex) $V_1$ at the decoder side.

The techniques, described above, may be implemented as computer software using computer-readable instructions and physically stored in one or more computer-readable media. For example, FIG. 11 shows a computer system 1100 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 11:
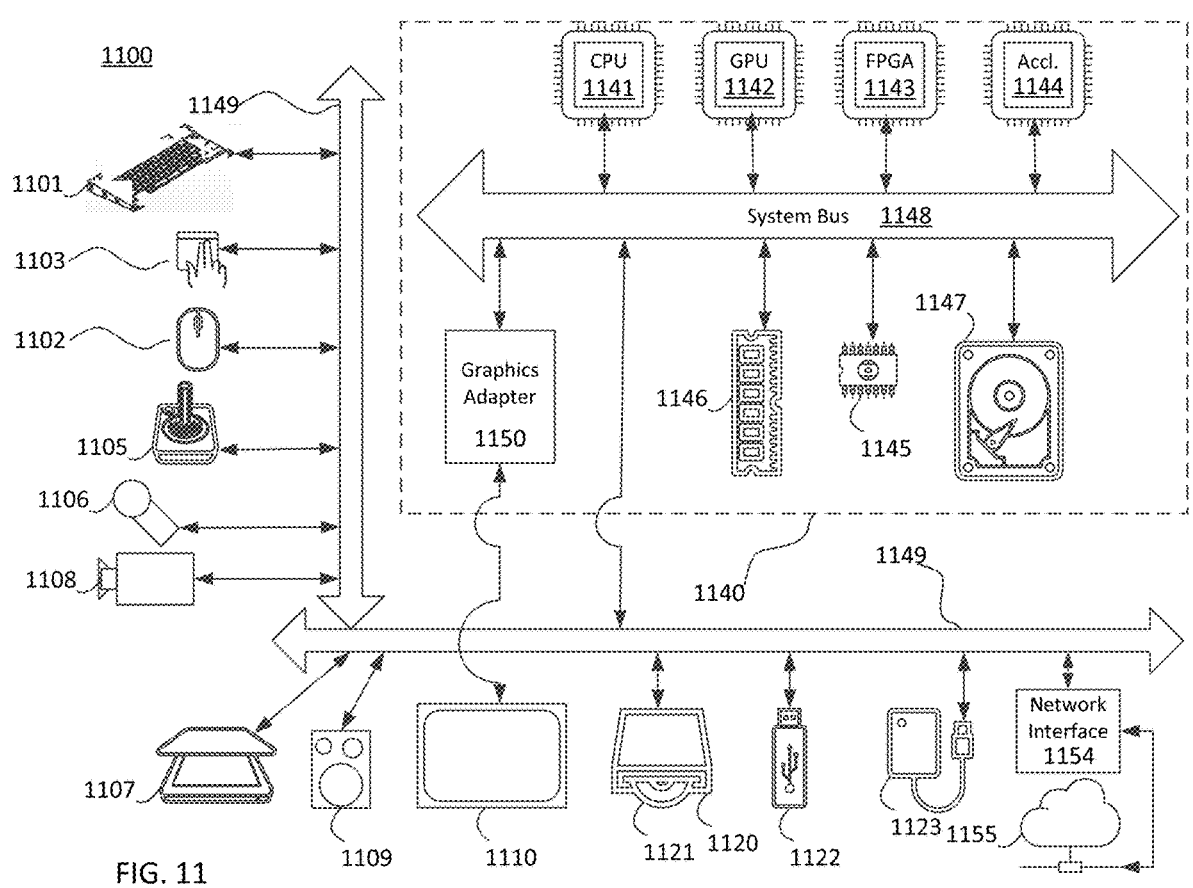
FIG. 11 is a diagram of a computer system suitable for implementing the embodiments of the present disclosure.

The components shown in FIG. 11 for computer system 1100 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, data-glove, joystick 1105, microphone 1106, scanner 1107, camera 1108.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, data glove, or joystick 1105, but there may also be tactile feedback devices that do not serve as input devices). For example, such devices may be audio output devices (such as: speakers 1109, headphones (not depicted)), visual output devices (such as screens 1110 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1100 may also include human accessible storage devices and their associated media such as optical media including CD/DVD ROM/RW 1120 with CD/DVD or the like media 1121, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1149 (such as, for example USB ports of the computer system 1100; others are commonly integrated into the core of the computer system 1100 by attachment to a system bus as described below (for example Ethernet interface into a PC computer system or cellular network interface into a smartphone computer system). Using any of these networks, computer system 1100 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 1155. Certain protocols and protocol stacks may be used on each of those networks and network interfaces as described above.

Aforementioned human interface devices, human-accessible storage devices, and network interfaces 1154 may be attached to a core 1140 of the computer system 1100.

The core 1140 may include one or more Central Processing Units (CPU) 1141, Graphics Processing Units (GPU) 1142, specialized programmable processing units in the form of Field Programmable Gate Areas (FPGA) 1143, hardware accelerators for certain tasks 1144, and so forth. These devices, along with Read-only memory (ROM) 1145, Random-access memory 1146, internal mass storage such as internal non-user accessible hard drives, SSDs, and the like 1147, may be connected through a system bus 1148. In some computer systems, the system bus 1148 may be accessible in the form of one or more physical plugs to enable extensions by additional CPUs, GPU, and the like. The peripheral devices may be attached either directly to the core's system bus 1148, or through a peripheral bus 1149. Architectures for a peripheral bus include PCI, USB, and the like. A graphics adapter 1150 may be included in the core 1140.

CPUs 1141, GPUs 1142, FPGAs 1143, and accelerators 1144 may execute certain instructions that, in combination, may make up the aforementioned computer code. That computer code may be stored in ROM 1145 or RAM 1146. Transitional data may be also be stored in RAM 1146, whereas permanent data may be stored for example, in the internal mass storage 1147. Fast storage and retrieve to any of the memory devices may be enabled through the use of cache memory, that may be closely associated with one or more CPU 1141, GPU 1142, mass storage 1147, ROM 1145, RAM 1146, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 1100, and specifically the core 1140 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1140 that are of non-transitory nature, such as core-internal mass storage 1147 or ROM 1145. The software implementing various embodiments of the present disclosure may be stored in such devices and executed by core 1140. A computer-readable medium may include one or more memory devices or chips, according to particular needs. The software may cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system may provide functionality as a result of logic hardwired or otherwise embodied in a circuit (for example: accelerator 1144), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method performed by at least one processor in a decoder, the method comprising: receiving a coded video bitstream that includes a compressed two dimensional (2D) mesh corresponding to a surface of three dimensional (3D) volumetric object; predicting a current vertex included in the compressed 2D mesh based on an interpolation-based hierarchical prediction scheme that uses at least one sampled vertex included in the compressed 2D mesh; deriving a prediction residual associated with the predicted current vertex; and reconstructing a boundary vertex associated with the 3D volumetric object based on the predicted current vertex and the derived prediction residual.

(2) The method according to feature (1), in which the interpolation-based hierarchical prediction scheme includes (i) a first prediction type that predicts a vertex included in the compressed 2D mesh by applying uni-directional prediction using the at least one sampled vertex, and (ii) a second prediction type that predicts the vertex included in the compressed 2D mesh by applying bi-directional prediction using the at least one sampled vertex and another sampled vertex included in the compressed 2D mesh.

(3) The method according to feature (2), in which the current vertex is predicted in accordance with the first prediction type in which the at least one sampled vertex is predicted before the current vertex.

(4) The method according to feature (2), in which the current vertex is predicted in accordance with the second prediction type.

(5) The method according to feature (4), in which the at least one sampled vertex is predicted in accordance with the first prediction type, and the another sampled vertex is predicted in accordance with the first prediction type.

(6) The method according to feature (4), in which the at least one sampled vertex is predicted in accordance with the first prediction type, and the another sampled vertex is predicted in accordance with the second prediction type.

(7) The method according to feature (4), in which the at least one sampled vertex and the another sampled vertex are in opposite directions.

(8) The method according to feature (4), in which an interval between the at least one sampled vertex and the another sampled vertex is specified in a syntax element included in the coded video bitstream.

(9) The method according to any one of features (1)-(8), in which the prediction residual is derived in accordance with an N-point 1-D transform.

(10) The method according to any one of features (1)-(8), in which the prediction residual is directed in accordance with an N×N 2-D transform.

(11) A decoder comprising: at least one memory configured to store program code; and at least one processor configured to read the program code and operate as instructed by the program code, the program code including: receiving code configured to cause the at least one processor to receive a coded video bitstream that includes a compressed two dimensional (2D) mesh corresponding to a surface of three dimensional (3D) volumetric object; predicting code configured to cause the at least one processor to predict a current vertex included in the compressed 2D mesh based on an interpolation-based hierarchical prediction scheme that uses at least one sampled vertex included in the compressed 2D mesh; deriving code configured to cause the at least one processor to derive a prediction residual associated with the predicted current vertex; and reconstructing code configured to cause the at least one processor to reconstruct a boundary vertex associated with the 3D volumetric object based on the predicted current vertex and the derived prediction residual.

(12) The decoder according to feature (11), in which the interpolation-based hierarchical prediction scheme includes (i) a first prediction type that predicts a vertex included in the compressed 2D mesh by applying uni-directional prediction using the at least one sampled vertex, and (ii) a second prediction type that predicts the vertex included in the compressed 2D mesh by applying bi-directional prediction using the at least one sampled vertex and another sampled vertex included in the compressed 2D mesh.

(13) The decoder according to feature (12), in which the current vertex is predicted in accordance with the first prediction type in which the at least one sampled vertex is predicted before the current vertex.

(14) The decoder according to feature (12), in which the current vertex is predicted in accordance with the second prediction type.

(15) The decoder according to feature (14), in which the at least one sampled vertex is predicted in accordance with the first prediction type, and the another sampled vertex is predicted in accordance with the first prediction type.

(16) The decoder according to feature (14), in which the at least one sampled vertex is predicted in accordance with the first prediction type, and the another sampled vertex is predicted in accordance with the second prediction type.

(17) The decoder according to feature (14), in which the at least one sampled vertex and the another sampled vertex are in opposite directions.

(18) The decoder according to feature (14), in which an interval between the at least one sampled vertex and the another sampled vertex is specified in a syntax element included in the coded video bitstream.

(19) The decoder according to any one of features (11)-(18), in which the prediction residual is derived in accordance with an N-point 1-D transform.

(20) A non-transitory computer readable medium having instructions stored therein, which, when executed by at least one processor in a decoder, causes the at least one processor to execute: receiving a coded video bitstream that includes a compressed two dimensional (2D) mesh corresponding to a surface of three dimensional (3D) volumetric object; predicting a current vertex included in the compressed 2D mesh based on an interpolation-based hierarchical prediction scheme that uses at least one sampled vertex included in the compressed 2D mesh; deriving a prediction residual associated with the predicted current vertex; and reconstructing a boundary vertex associated with the 3D volumetric object based on the predicted current vertex and the derived prediction residual.

What is claimed is:

1. A method performed by at least one processor in a decoder, the method comprising:
    receiving a coded video bitstream that includes a compressed two dimensional (2D) mesh corresponding to a surface of three dimensional (3D) volumetric object;
    predicting a current vertex included in the compressed 2D mesh based on an interpolation-based hierarchical prediction scheme that uses at least one sampled vertex included in the compressed 2D mesh;
    deriving a prediction residual associated with the predicted current vertex; and
    reconstructing a boundary vertex associated with the 3D volumetric object based on the predicted current vertex and the derived prediction residual.

2. The method according to claim 1, wherein the interpolation-based hierarchical prediction scheme includes (i) a first prediction type that predicts a vertex included in the compressed 2D mesh by applying uni-directional prediction using the at least one sampled vertex, and (ii) a second prediction type that predicts the vertex included in the compressed 2D mesh by applying bi-directional prediction using the at least one sampled vertex and another sampled vertex included in the compressed 2D mesh.

3. The method according to claim 2, wherein the current vertex is predicted in accordance with the first prediction type in which the at least one sampled vertex is predicted before the current vertex.

4. The method according to claim 2, wherein the current vertex is predicted in accordance with the second prediction type.

5. The method according to claim 4, wherein the at least one sampled vertex is predicted in accordance with the first prediction type, and the another sampled vertex is predicted in accordance with the first prediction type.

6. The method according to claim 4, wherein the at least one sampled vertex is predicted in accordance with the first prediction type, and the another sampled vertex is predicted in accordance with the second prediction type.

7. The method according to claim 4, wherein the at least one sampled vertex and the another sampled vertex are in opposite directions.

8. The method according to claim 4, wherein an interval between the at least one sampled vertex and the another sampled vertex is specified in a syntax element included in the coded video bitstream.

9. The method according to claim 1, wherein the prediction residual is derived in accordance with an N-point 1-D transform.

10. The method according to claim 1, wherein the prediction residual is directed in accordance with an N×N 2-D transform.

11. A decoder comprising:
    at least one memory configured to store program code; and
    at least one processor configured to read the program code and operate as instructed by the program code, the program code including:
        receiving code configured to cause the at least one processor to receive a coded video bitstream that includes a compressed two dimensional (2D) mesh corresponding to a surface of three dimensional (3D) volumetric object;
        predicting code configured to cause the at least one processor to predict a current vertex included in the compressed 2D mesh based on an interpolation-based hierarchical prediction scheme that uses at least one sampled vertex included in the compressed 2D mesh;
        deriving code configured to cause the at least one processor to derive a prediction residual associated with the predicted current vertex; and
        reconstructing code configured to cause the at least one processor to reconstruct a boundary vertex associated with the 3D volumetric object based on the predicted current vertex and the derived prediction residual.

12. The decoder according to claim 11, wherein the interpolation-based hierarchical prediction scheme includes (i) a first prediction type that predicts a vertex included in the compressed 2D mesh by applying uni-directional prediction using the at least one sampled vertex, and (ii) a second prediction type that predicts the vertex included in the compressed 2D mesh by applying bi-directional prediction using the at least one sampled vertex and another sampled vertex included in the compressed 2D mesh.

13. The decoder according to claim 12, wherein the current vertex is predicted in accordance with the first prediction type in which the at least one sampled vertex is predicted before the current vertex.

14. The decoder according to claim 12, wherein the current vertex is predicted in accordance with the second prediction type.

15. The decoder according to claim 14, wherein the at least one sampled vertex is predicted in accordance with the first prediction type, and the another sampled vertex is predicted in accordance with the first prediction type.

16. The decoder according to claim 14, wherein the at least one sampled vertex is predicted in accordance with the first prediction type, and the another sampled vertex is predicted in accordance with the second prediction type.

17. The decoder according to claim 14, wherein the at least one sampled vertex and the another sampled vertex are in opposite directions.

18. The decoder according to claim 14, wherein an interval between the at least one sampled vertex and the another sampled vertex is specified in a syntax element included in the coded video bitstream.

19. The decoder according to claim 11, wherein the prediction residual is derived in accordance with an N-point 1-D transform.

20. A non-transitory computer readable medium having instructions stored therein, which, when executed by at least one processor in a decoder, causes the at least one processor to execute:
  receiving a coded video bitstream that includes a compressed two dimensional (2D) mesh corresponding to a surface of three dimensional (3D) volumetric object;
  predicting a current vertex included in the compressed 2D mesh based on an interpolation-based hierarchical prediction scheme that uses at least one sampled vertex included in the compressed 2D mesh;
  deriving a prediction residual associated with the predicted current vertex; and
  reconstructing a boundary vertex associated with the 3D volumetric object based on the predicted current vertex and the derived prediction residual.

* * * * *